Dec. 12, 1950     F. W. BROCK     2,533,347
TRIPLE SLIDE HOLDER DEVICE FOR STEREOSCOPIC SLIDES
Filed Jan. 11, 1949     5 Sheets-Sheet 1
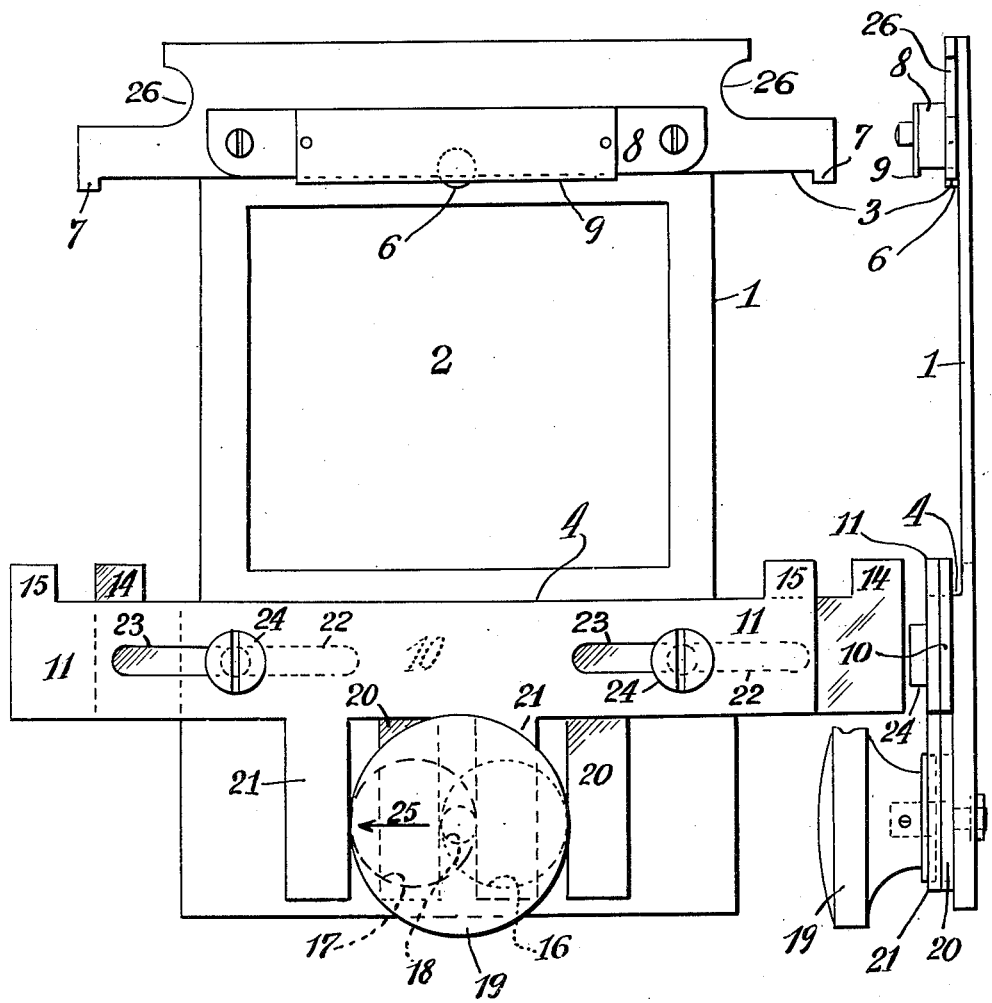
Frederick W. Brock INVENTOR.

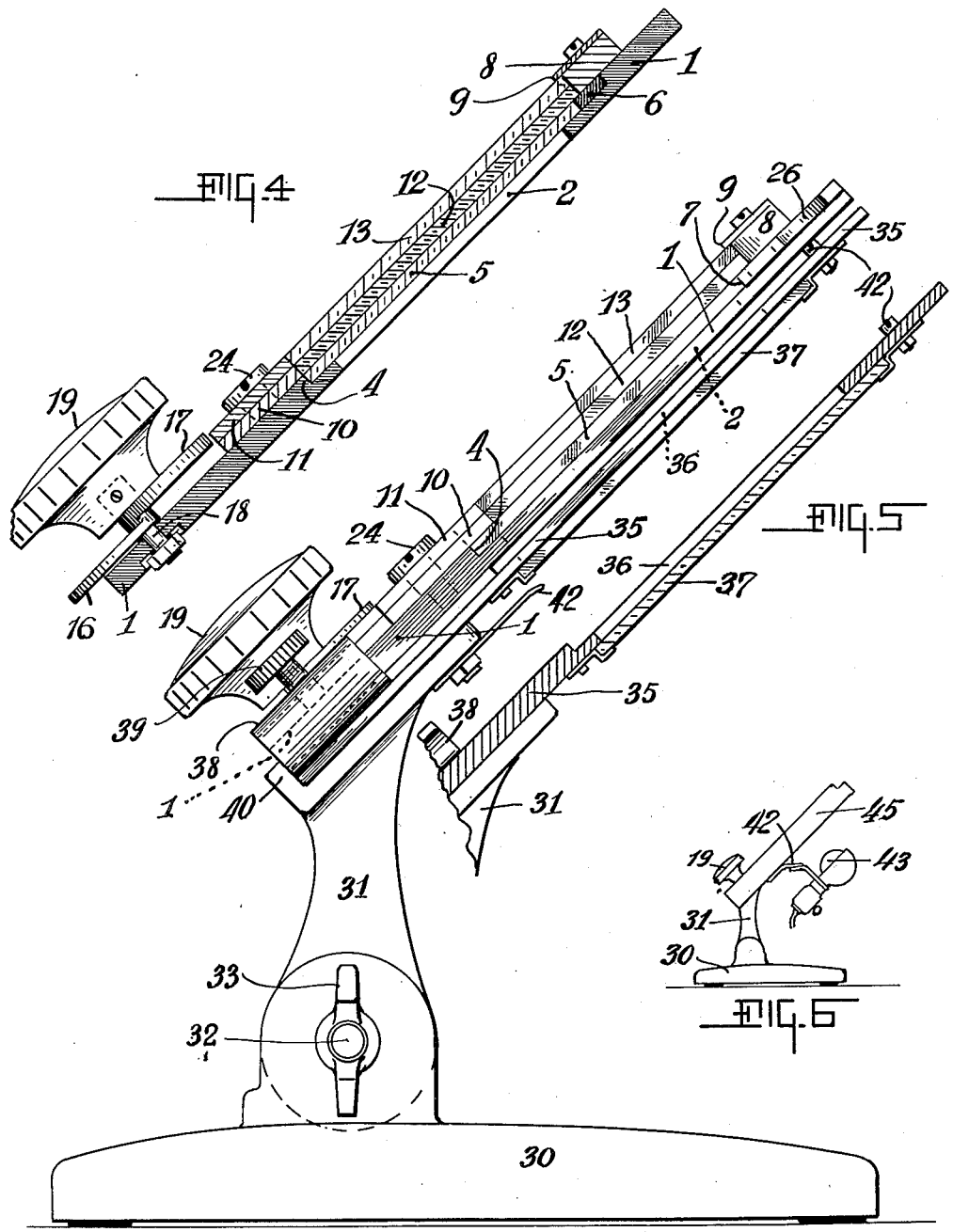

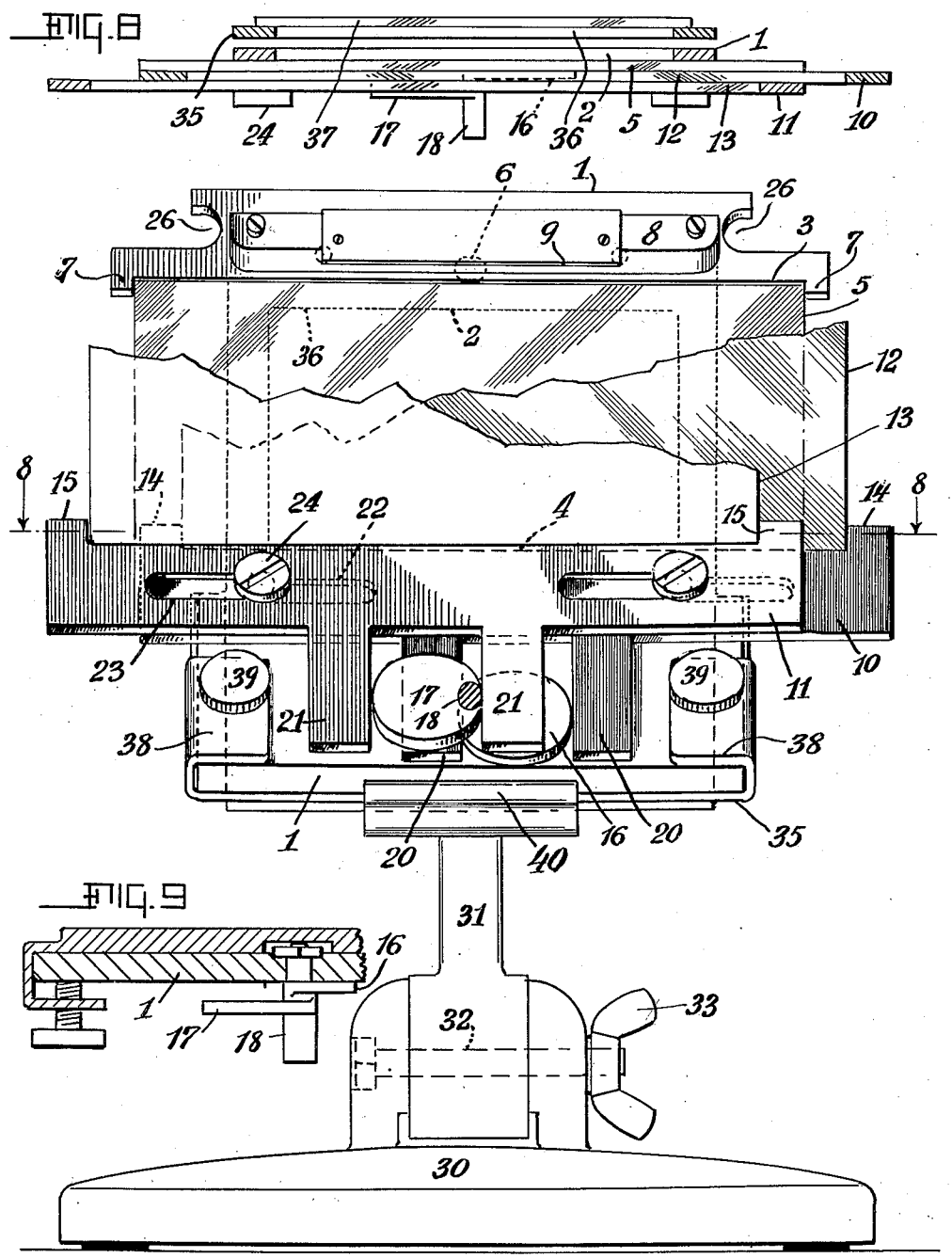

Dec. 12, 1950 F. W. BROCK 2,533,347
TRIPLE SLIDE HOLDER DEVICE FOR STEREOSCOPIC SLIDES
Filed Jan. 11, 1949 5 Sheets-Sheet 4
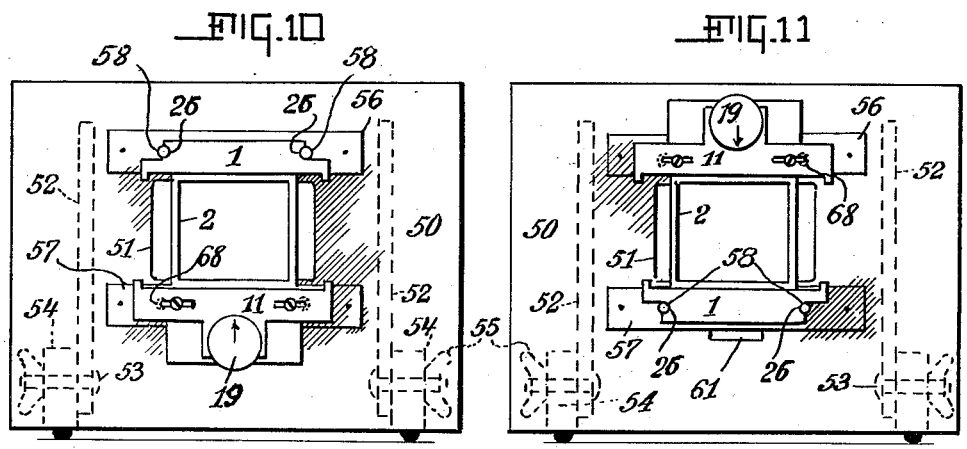
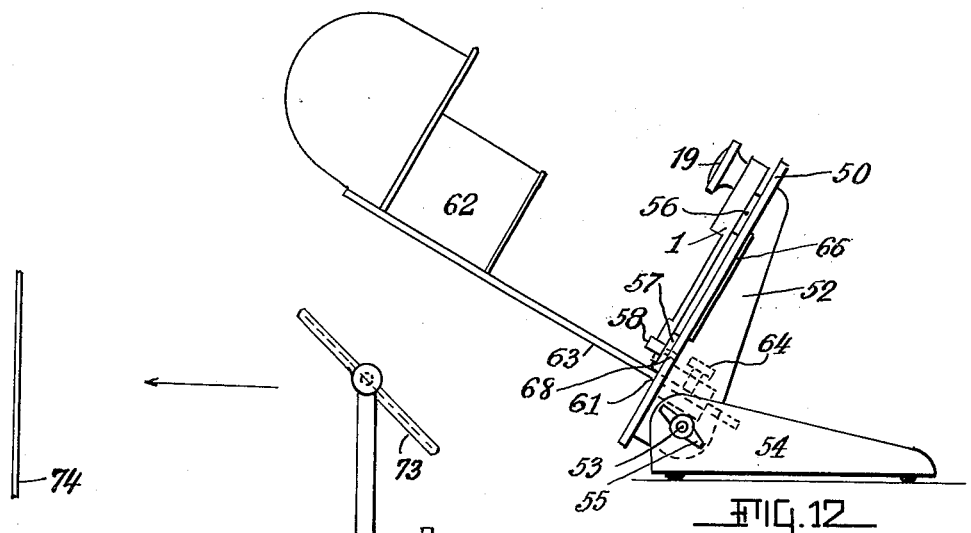
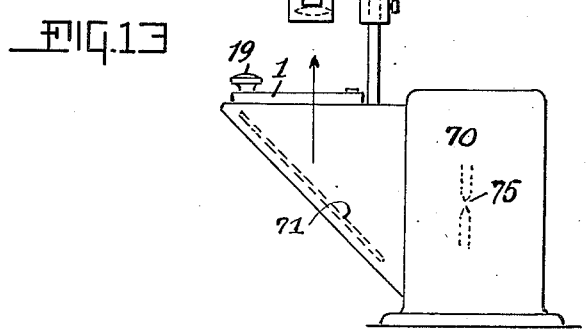

Dec. 12, 1950  F. W. BROCK  2,533,347
TRIPLE SLIDE HOLDER DEVICE FOR STEREOSCOPIC SLIDES
Filed Jan. 11, 1949  5 Sheets-Sheet 5
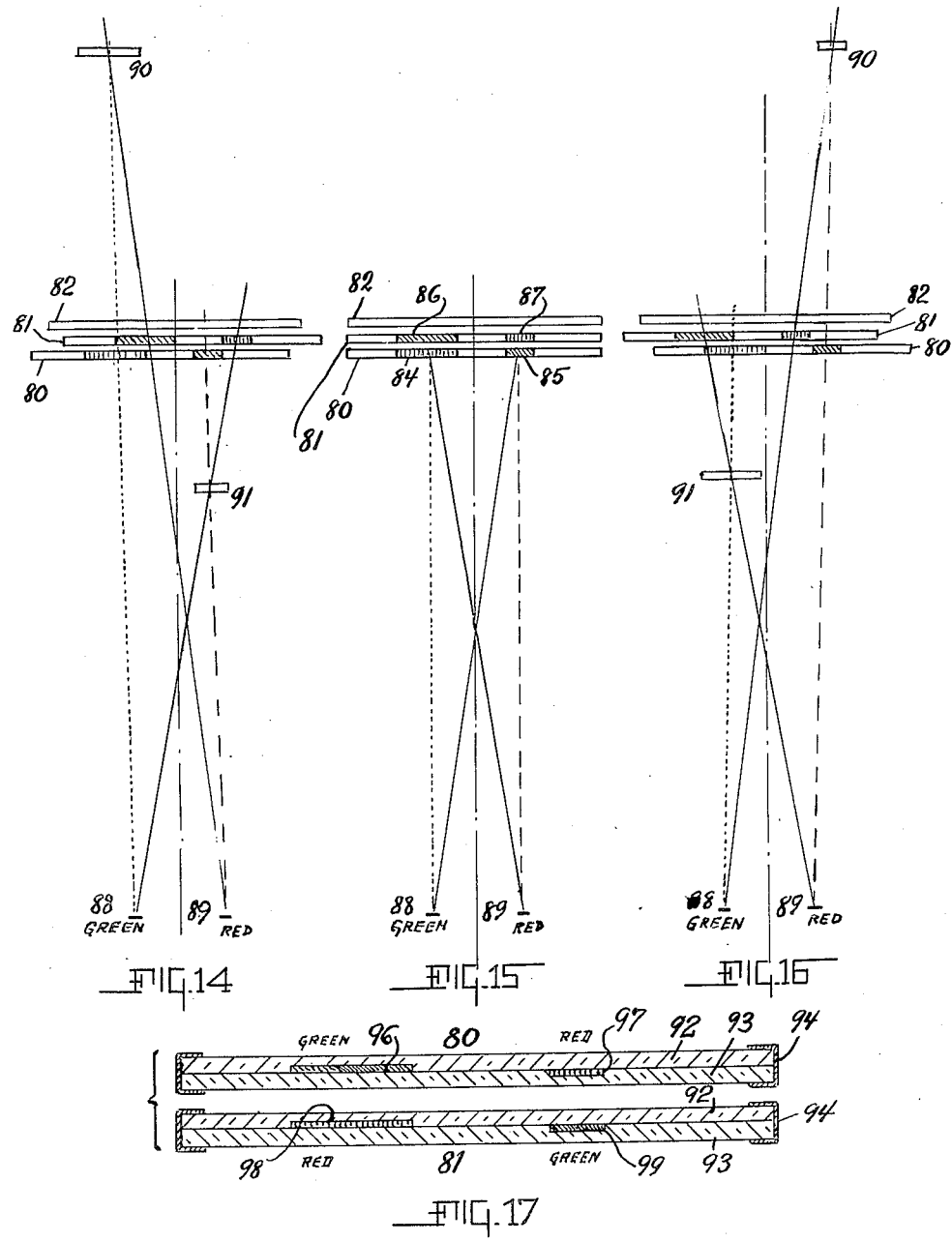

Patented Dec. 12, 1950

2,533,347

UNITED STATES PATENT OFFICE 2,533,347

TRIPLE SLIDE HOLDER DEVICE FOR STEREOSCOPIC SLIDES

Frederick William Brock, Tompkinsville, N. Y., assignor to Keystone View Company, Meadville, Pa., a corporation of Pennsylvania Application January 11, 1949, Serial No. 70,190

1 Claim. (Cl. 88—20)

The practice of visual training and techniques which involve binocular vision makes use of a great variety of stereoscopic and non-stereoscopic slides which are manipulated so as to present pictorial representations to the eyes of the patient in such a manner and according to such procedures and optical principles as will provide the means whereby the practitioner may examine, test and train the visual binocular abilities of the patient. Such stereoscopic and non-stereoscopic slides are also used for home training.

The methods and means for supporting and operating the slides must be of simple efficient construction and design so that the physical labor involved is performed without effort. The slides may be presented for direct viewing through color-separated spectacles or for viewing through a stereoscope. It is an object of this invention to provide a device which is especially constructed and adapted for the presentation of the slides in several different kinds or types of arrangement selected for use in binocular visual training techniques.

One arrangement, for example, involves the use of three superposed slides of which the two front slides are movable in opposite directions while the third rear slide is stationary. When the two front slides are moved relative to each other and to the third slide, the latter forms a fixed target representation or object within a stereoscopic complement formed by the two front slides. The directions of movement of the first two slides causes the complementary figures to recede or advance optically with relation to the target on the third slide. The latter may in some cases be omitted and a plain glass plate substituted therefor.

Other training techniques use only two-color slides with pictorial representations in two complementary colors which are so arranged that when the slides are moved in opposite directions a selected portion of the pictorial representation is caused to recede or advance optically with relation to another selected portion of the same picture, and such other selected portion moves optically in the opposite direction, i. e. is caused to advance or recede optically as the case may be.

In view of the foregoing, it is one object of the invention to provide a novel and improved device for supporting and moving the slides. The device is conveniently called a stereo-motivator and is adapted to be used with the arrangements of slides as hereinabove described by way of example. The stereo-motivator may be used with other slide arrangements. The device is furthermore adapted to be supported on different types of easels which in themselves are novel and improved in accordance with this invention. The stereo-motivator is simple and efficient of construction and easy to use.

Inasmuch as the device may also be used for the operation of the two-color slides referred to, it is another feature of the invention to provide a novel and improved type of two-color slide, as well as providing a new method or construction of such slides.

Other objects of the invention and the advantages obtained by the use thereof will be pointed out in the following specification to be read in connection with the accompanying drawings in which:

Fig. 1 is a face view of the stereo-motivator showing the movable slide holding means in displaced positions with respect to one another.

Fig. 2 is a side view of Figure 1 looking from the right.

Fig. 3 is a side view of the stereo-motivator mounted upon an easel which itself presents improved features.

Fig. 4 is a detail sectional central view of the stereo-motivator removed from the easel.

Fig. 5 is a detail central sectional view of the easel alone, parts being broken away.

Fig. 6 is an outline sketch of Figure 3 illustrating illuminating means for the slides.

Fig. 7 is a front view of Figure 3 with parts omitted and parts broken away.

Fig. 8 is a sectional view taken on the line 8—8 of Figure 7.

Fig. 9 is a detail view in section showing the construction and location of certain cams used for moving the slides.

Fig. 10 shows the stereo-motivator mounted upon an easel of a type different from the one shown in Figures 3 and 7, the stereo-motivator being placed upon the easel in the same relative position as in Figure 7.

Fig. 11 is a view similar to Figure 10 but shows the stereo-motivator inverted.

Fig. 12 is a side view of Figure 11 showing the use of a stereoscope.

Fig. 13 shows the stereo-motivator used in a projection apparatus.

Figs. 14, 15 and 16 illustrate diagrammatically the movements and optical results obtained from the use of two-color slides.

Fig. 17 shows two-color slides which are made according to a novel method of construction.

Referring to Figures 1 to 4, the stereo-motivator device comprises a back or base 1 having a view opening 2. At the top the device is formed with an overhang as at 3 and in line therewith there is a ledge 4 in the lower part. The third fixed slide referred to hereinabove is marked 5 and is placed against the back 1, the lower edge of the slide resting upon the ledge 4, the upper edge of the slide abutting a rubber insert button 6 whereby to keep the slide on the ledge 4 against the back 1 and prevent the slide from moving sideways. The slide 5 is held between lugs 7, 7 on the back 1 and these lugs will of themselves prevent the slide from moving across the device, but inasmuch as there may be slight inaccuracies in the width dimensions of the slides the rubber button 6 is provided to keep the slide firmly in place.

At the top the back 1 carries a spacer 8 with an overhanging lip 9. At the bottom the back carries two movable slide holders 10 and 11 in vertical alinement with the spacer 8. The slide holders receive the two movable slides 12 and 13 which rest upon the upper edges of the holders between side lugs 14, 14 and 15, 15, respectively, while the upper edges of the slides lie up against the spacer 8 behind the overhanging lip 9 as clearly shown in Figures 3 and 4. The slide holders are moved in opposite directions by offset cams 16 and 17 which are carried by a shaft 18 having an operating knob 19. The shaft has its bearing in the back 1 as shown in Figures 4 and 9.

The rear cam 16 is in alinement with the rear movable slide holder 10. The front cam 17 is in alinement with the front slide holder 11. Each holder has a pair of legs 20 and 21, respectively, which is engaged by the respective cams as shown. Each slide holder has also two slots 22, 22 and 23, 23, respectively, which move over guiding screws 24, 24 screwed into the back 1. The operating knob 19 bears an indicator 25.

At the top the back is formed with supporting recesses 26.

The stereo-motivator device may be supported on an easel of the type shown in Figures 3 and 7. The easel is supported upon a base 30 and upon the latter there is pivotally supported an arm 31 upon a threaded bolt 32 having a wing nut 33. When the latter is tightened, the arm may be secured upon the stand in any desired inclined position. The arm 31 carries the easel 35 having a view opening 36 closed with a ground glass 37, Figure 5. The easel has two inturned hooks 38, 38 with clamping screws 39, 39. At the junction between the arm 31 and the foot of the easel 35 there is formed a shelf 40.

The stereo-motivator is mounted upon the easel by inserting it from above into the hooks 38 and moving it down so that it comes to rest upon the shelf 40, Figures 3 and 7. At the top the stereo-motivator then rests against spacing screws 42 secured in the top of the easel so that the two movable front slides lie parallel to the easel and the ground glass. Thereafter the screws 39 are tightened against the lower portion of the stereo-motivator and the latter is thus securely clamped to the easel. The inclined position of the device may then be regulated by moving the easel arm 31 with relation to the base 30. The easel may have a clip 42 for the support of a lamp 43 behind the ground glass. This is shown in Figure 6 in which the stereo-motivator and the easel are combined in an outline figure marked 45.

The relation between the three slides in the stereo-motivator and the easel 35 with the ground glass 37 is perhaps best seen in Figure 8 in which details are omitted. In that figure as well as in Figure 7 the two front movable slide holders 10 and 11 are shown displaced with respect to each other. If the slides 12 and 13 are complementary stereoscopic slides and the fixed slide 5 bears a pictorial representation in the form of a target or fixed object having a certain relation to the pictures on the stereoscopic slides, then, when the latter are moved an equal distance in opposite directions by the operation of the hand knob 19, a stereoscopic image will be formed by the two slides, depending upon the direction of movement thereof and the image will be caused to recede or advance with respect to the target.

The stereoscopic background and its target may be used for direct view binocular training without the use of any other instrument. The patient inserts the proper slides as may be directed in an instruction book, for example, and then rotates the knob 19 in either direction. The cams 16 and 17 will then move the slide holders an equal amount in opposite directions. The patient will then view directly the stereoscopic background and its optical relation to the target on the third fixed slide. When the indicator 25 stands vertically, the slides 12 and 13 overlap in neutral position. The amount of turning of the knob in order to form the stereoscopic background image may be observed from the correspondingly inclined position of the indicator 25. When the latter stands horizontal, the slides are displaced to the greatest extent. When the front slide 13 is moved to the right and the second slide 12 is moved to the left, the stereoscopic background is caused to advance, and vice versa.

Figure 10 shows the stereo-motivator device mounted upon an easel which is different from that shown in Figure 3. The easel 50 in Figure 10 is in the form of a rectangular board having a view opening 51. The easel is secured to two arms 52, 52 which in turn are pivoted on screws 53, 53 in foot pieces 54, 54. The screws have wing nuts 55. The arms 52 with the easel thereon may therefore be adjusted to take any desired inclined position. The easel is provided with two spacers 56 and 57 which are strips of material extending across the board 50. In Figure 10 the spacer 56 carries two studs 58, 58. The recesses 26 in the stereo-motivator fit over these studs. By placing it upon the easel with the studs projecting through the recesses, the stereo-motivator hangs upon the studs and rests against the easel. The operating knob 19 may then be turned to move the slides in the slide holders as hereinabove described.

In Figure 11 the stereo-motivator is shown supported upon studs 58 inserted in the lower spacer 57, the stereo-motivator being inverted but otherwise supported upon the easel as in Figure 10. In its inverted position the stereo-motivator uncovers a hole 61 in the easel for the purpose of placing a stereoscope in the easel. This is shown in Figure 12 which is a side view of Figure 11. A stereoscope 62 has its shaft 63 inserted through the hole 61 and clamped in position by a screw 64. By this arrangement the slides in the stero-motivator may be viewed through the stereoscope. The front slide in such case may, for example, bear a right hand picture and the second slide bear a left hand picture of the same object. The third fixed slide may be a blank. The movement of the slides by operation of the knob 19 is not intended to cause the pictures to overlap, but will afford the patient a means for separating the pictures more or less. The arrangement shown in Figure 12 would be similar to the arrangement and operation of slides in the instruments known as split slide holders.

On the other hand, the fixed third slide in the stereo-motivator may bear a full stereoscopic pictorial representation and the two movable slides may then contain the target figures. If then the stereo-motivator is operated the targets would recede or advance with respect to the stereoscopic background. The stereo-motivator rests against the spacers 56 and 57 because it is desirable to provide room for the insertion of the slides from either side. The view opening 51 may be closed by a ground glass 66, Figure 12, and of course a lamp may be attached as shown in Figure 6. The easel 50 will be provided with holes 68 in both spacers 56 and 57 for the reception of the studs 58 so that change from one spacer to the other may be made.

The stereo-motivator is adapted for use in a projection apparatus as illustrated in Figure 15. The stereo-motivator is identified by the numerals 1 and 19 and is placed in the apparatus 70. The latter contains a source of illumination 75 and the light rays are reflected upwardly through the slides by a reflecting mirror 71. Above the stereo-motivator there is arranged a suitable lens assembly 72 and the light rays are finally reflected by another mirror 75 upon a screen 74.

The color depth technique hereinabove referred to involves the use of a pair of slides on which some figures advance and other figures recede by the simple transverse movement of the slides by means of the stereo-motivator, the slides being viewed through spectacles or lenses in complementary colors. In disclosing this aspect of the invention the colors red and green are selected as being in current use.

Referring now to Figures 14, 15 and 16, the stereo-motivator (not shown in these figures) carries two slides 80 and 81. The third slide, if any, is a blank 82. The slide 80 has a figure 84 colored red, another figure 85 colored green. The other slide 81 has the corresponding figure 86 colored green and the other figure 87 colored red, that is, the reverse of the figures on the slide 80. In both cases the figures are colored and the background transparent. The eye positions are shown at 88 using a green lens and at 89 using a red lens.

The neutral overlapping positions of the slides are shown in Figure 15, compare Figures 10 and and 11. When now the slides 80 and 81 are moved transversely by operation of the stereo-motivator so that they take the positions shown in Figure 14, the figures 84 and 86 separate and appear optically as receding, whereas the figures 85 and 87 converge and appear optically as advancing. When the slides 80 and 81 are moved in the opposite directions as illustrated in Figure 16, the opposite optical illusion will result, namely the figures 84 and 86 converge and advance, while the figures 85 and 87 separate and appear to recede.

The apparent receding and advancing movements of the figures are indicated at 90 and 91, respectively. The stereo-motivator is not shown in Figures 14, 15 and 16 because it might confuse the diagrams. A comparison with Figure 8 will clearly show the respective positions of the slide holders.

In the production of colored slides it is not as yet possible or practical to produce the two colors on one piece of glass. Hence the invention includes as a feature the making of a single slide as shown in Fig. 17 consisting of two transparent plates 92 and 93. The plates are held together by a suitable binding 94 to form a single slide 80. On the inner face of the plate 92 is placed the green figure 96. On the opposed inner face of the plate 93 is placed the red figure 97. The other slide 81 has the same figures placed in the same positions but reversed in the complementary colors as shown red at 91 and green at 99.

For example, the plate 92 may have a green circle and the plate 93 a red dot in slide 80. On slide 81 plate 92 will then have a red circle and plate 93 a green dot.

In the functioning of two-color slides viewed through color separated spectacles or lenses, a selected portion of a picture—the green-red circle—may be made to recede or advance optically with relation to another selected portion—the red-green dot. The slides bear the same pictures but only a portion of the picture recedes while another portion advances. In ordinary stereoscopic slides the entire picture advances or recedes.

The use of stereoscopic, non-stereoscopic, two-color or other slides depends upon the particular vision problem involved. The presentation of such slides and the movements of the slides under varying conditions may all be accomplished by the use of the stereo-motivator device mounted upon suitable easel or other supports.

I claim:

A device for presenting and operating a slide assembly of superposed stereoscopically related slides consisting of two movable transparent slides and a third rear immovable slide, said device comprising a back member having a view opening framed therein, means integral with said back member for supporting said third slide immovable thereupon across said view opening, a pair of movable superposed slide holders, means for slidably supporting said holders upon said back member in front thereof and below said view opening, a projection on said back member above the view opening in vertical alinement with said slide holders for supporting a transparent stereoscopic slide in each of said holders in front of said immovable slide, said transparent slides being stereoscopic complements one of the other, said immovable slide bearing an object pictorially related to said stereoscopic complement, a pair of legs formed in each of said slide holders, cams engaging said legs to move the slide holders with the slides therein an equal distance in opposite directions across said view opening and in front of the immovable slide and an operating knob for actuating the said cams.

FREDERICK WILLIAM BROCK.

REFERENCES CITED

The following references are of record in the file of this patent:

UNITED STATES PATENTS

| Number | Name | Date |
| --- | --- | --- |
| 1,498,743 | Macy | June 24, 1924 |
| 1,894,148 | Barr | Jan. 10, 1933 |
| 1,948,901 | Brombach | Feb. 27, 1934 |
| 2,132,670 | Young | Oct. 11, 1938 |
| 2,144,253 | Bernhard | Jan. 17, 1939 |
| 2,194,682 | Abrams | Mar. 26, 1940 |
| 2,196,906 | Sherman | Apr. 9, 1940 |
| 2,281,101 | Land | Apr. 28, 1942 |
| 2,362,588 | Shepard | Nov. 14, 1944 |
| 2,362,857 | Renshaw | Nov. 14, 1944 |
| 2,391,248 | Koch | Dec. 18, 1945 |
| 2,422,384 | Alexander | June 17, 1947 |